(12) United States Patent
Yokogawa et al.

(10) Patent No.: US 8,726,514 B2
(45) Date of Patent: May 20, 2014

(54) PANEL MANUFACTURING METHOD

(71) Applicant: Nakahara Co., Ltd., Kasai (JP)

(72) Inventors: Keitaro Yokogawa, Kasai (JP); Isao Yoshijima, Kasai (JP); Shuichi Tome, Kasai (JP)

(73) Assignee: Nakahara Co., Ltd., Kasai-shi, Hyogo ( * ) Notice: Subject to any disclaimer, the term of this patent is extended or adjusted under 35 U.S.C. 154(b) by 0 days.

(21) Appl. No.: 13/677,436

(22) Filed: Nov. 15, 2012

(65) Prior Publication Data

US 2013/0074314 A1 Mar. 28, 2013

Related U.S. Application Data

(63) Continuation of application No. PCT/JP2011/066529, filed on Jul. 21, 2011.

(30) Foreign Application Priority Data

Jul. 25, 2010 (JP) ................. 2010-166610

(51) Int. Cl.
*B21D 47/00* (2006.01)
*B21D 53/00* (2006.01)

(52) U.S. Cl.
USPC .............. 29/897.32; 29/469.5; 29/525.13; 29/525.14; 403/282

(58) Field of Classification Search
USPC ................ 29/897.2, 897.32, 469.5, 525.13, 29/525.14, 709, 714; 403/282
See application file for complete search history.

(56) References Cited

U.S. PATENT DOCUMENTS

| 4,916,284 | A | * | 4/1990 | Petrick ................. 219/121.64 |
| 5,632,413 | A | * | 5/1997 | Herring et al. ................. 222/1 |
| 5,749,992 | A | * | 5/1998 | Eklund et al. ............... 156/212 |
| 5,787,646 | A | * | 8/1998 | Nakamori ..................... 49/502 |

(Continued)

FOREIGN PATENT DOCUMENTS

| JP | 04-64424 U | 6/1992 |
| JP | 08-090266 A | 4/1996 |

(Continued)

OTHER PUBLICATIONS

Notification of Transmittal of Translation of the International Preliminary Report on Patentability for the corresponding International application No. PCT/JP2011/066529.

(Continued)

*Primary Examiner* — Jermie Cozart
(74) *Attorney, Agent, or Firm* — Muncy, Geissler, Olds & Lowe, P.C.

(57) ABSTRACT

An object of the present invention is to provide a panel manufacturing method capable of easily adapting to manufacture of panels, such as door panels, of different sizes. The present invention provides a panel manufacturing method for a panel made of an outer plate integrated with an inner plate. The method includes a step of applying an adhesive to a predetermined place on the outer plate; a step of mating the outer plate and the inner plate with each other and providing preliminary bonding by laser welding; a step of hemming by bending an outer edge portion of the pre-bonded outer plate to wrap over a circumferential edge portions of the inner plate and then pressing flat; and a step of sealing the panel, after the outer plate has undergone the hemming step on its circumferential edge portions, by applying an adhesive.

11 Claims, 12 Drawing Sheets

(56) References Cited

U.S. PATENT DOCUMENTS

| | | | | |
|---|---|---|---|---|
| 5,897,796 | A * | 4/1999 | Forrest | 219/121.64 |
| 6,029,334 | A * | 2/2000 | Hartley | 29/464 |
| 6,180,199 | B1 * | 1/2001 | Herring et al. | 428/44 |
| 6,368,008 | B1 * | 4/2002 | Biernat et al. | 403/267 |
| 6,523,244 | B1 * | 2/2003 | Bissonnette | 29/509 |
| 6,696,147 | B1 * | 2/2004 | Herring et al. | 428/323 |
| 7,043,816 | B2 * | 5/2006 | Zaluzec et al. | 29/460 |
| 7,422,652 | B2 * | 9/2008 | Ondrus et al. | 156/322 |
| 2006/0016078 | A1 * | 1/2006 | Bladow et al. | 29/897.312 |
| 2008/0000071 | A1 * | 1/2008 | Chen et al. | 29/509 |
| 2008/0230588 | A1 * | 9/2008 | Hasegawa et al. | 228/173.6 |

FOREIGN PATENT DOCUMENTS

| | | |
|---|---|---|
| JP | 09-228412 A | 9/1997 |
| JP | 10-180373 A | 7/1998 |
| JP | 2004-303323 A | 10/2004 |
| JP | 2009-084842 A | 4/2009 |
| JP | 2009-097322 A | 5/2009 |

OTHER PUBLICATIONS

The International Search Report of the International Searching Authority mailed Oct. 11, 2011 for the corresponding international application No. PCT/JP2011/066529 (with English translation).

* cited by examiner

PANEL MANUFACTURING METHOD

CROSS-REFERENCES TO RELATED APPLICATIONS

This application is base a continuation of International Application No. PCT/JP2011/066529 filed on Jul. 21, 2011, which claims priority on the basis of Japanese Patent Application No. 2010-166610 filed on Jul. 25, 2010.

TECHNICAL FIELD

The present invention relates to a manufacturing method of double-wall panels composed of an outer plate and an inner plate, and more specifically to a manufacturing method of door panels for industrial equipment, automobile bonnet panels, etc.

BACKGROUND ART

Double-wall door panels composed of an outer plate and an inner plate are commonly found in, e.g., side doors for industrial equipment. The door panel's inner plate has a plurality of bottom portions and ridge portions. The bottom portions of the inner plate are bonded to the outer plate with adhesive. Then, an outer edge portion of the outer plate is bent inward to roll over an outer edge portion of the inner plate, and then pressed (hemming operation). The above is a method of fixing the outer plate and the inner plate to each other (see Patent Literature 1 for example).

In the double-wall door panel structure of this type, a foaming material may be placed between the outer plate and the ridge portions of the inner plate, to fill the inner space for reducing vibration and noises.

CITATION LIST

Patent Literature

Patent Literature 1: JP-A H09-228412 Gazette

SUMMARY OF INVENTION

Technical Problem

The above-described hemming operation requires molds of a size corresponding to the size of the door panel. Therefore, the mold takes a significant part of cost, and in addition, there is a disadvantage that a door panel of a different size requires molds of a different size, resulting in poor operability.

An object of the present invention is to provide a panel manufacturing method which can be adapted easily to manufacture of panels, such as door panels, of different sizes.

Solution to Problem

The present invention provides a panel manufacturing method for a panel made of an outer plate integrated with an inner plate. The method includes: a step of applying an adhesive to a predetermined place on the outer plate; a step of mating the outer plate and the inner plate with each other and providing preliminary bonding by laser welding; a step of hemming by bending an outer edge portion of the pre-bonded outer plate to wrap over a circumferential edge portions of the inner plate and then pressing flat; and a step of sealing the panel by applying an adhesive to the panel after completion of the hemming step performed to the outer plate's circumferential edge portion.

The hemming step may be performed in three or more sub-steps each involving the bending operation. Thus, the hemming step may include a sub step of bending and swaging mutually opposing intermediate portions in two longer sides of a rectangular panel; a sub step of bending and swaging a portion from one of the two short sides of the panel to the previously swaged intermediate portions; and a sub step of bending and swaging a portion from the remaining short side to the already swaged intermediate portions of the panel.

The adhesive in the adhesive application step and the adhesive in the sealing step may be supplied from a same adhesive tank. Further, the adhesive may be supplied from the adhesive tank to an adhesive supply device via pipes provided with a plurality of temperature sensors and a plurality of heaters controlled in relation to the temperature sensors. With this arrangement, each of the heaters is controlled independently from the others based on an output from a corresponding one of the temperature sensors.

Advantageous Effects of Invention

The present invention makes it easy to handle manufacture of panels, such as door panels, of different sizes, and thus enables efficient manufacture of different kinds of panels.

DESCRIPTION OF EMBODIMENTS

Embodiments of the present invention will be described in detail with reference to the drawings. It should be noted here that throughout the drawings the same or equivalent parts and components will be indicated with the same reference symbols, and in order to avoid redundancy in description, their description will not be repeated.

The door panel manufactured by the embodiment is a door panel for side door of a radiator room in industrial equipment for example.

Figure 1:
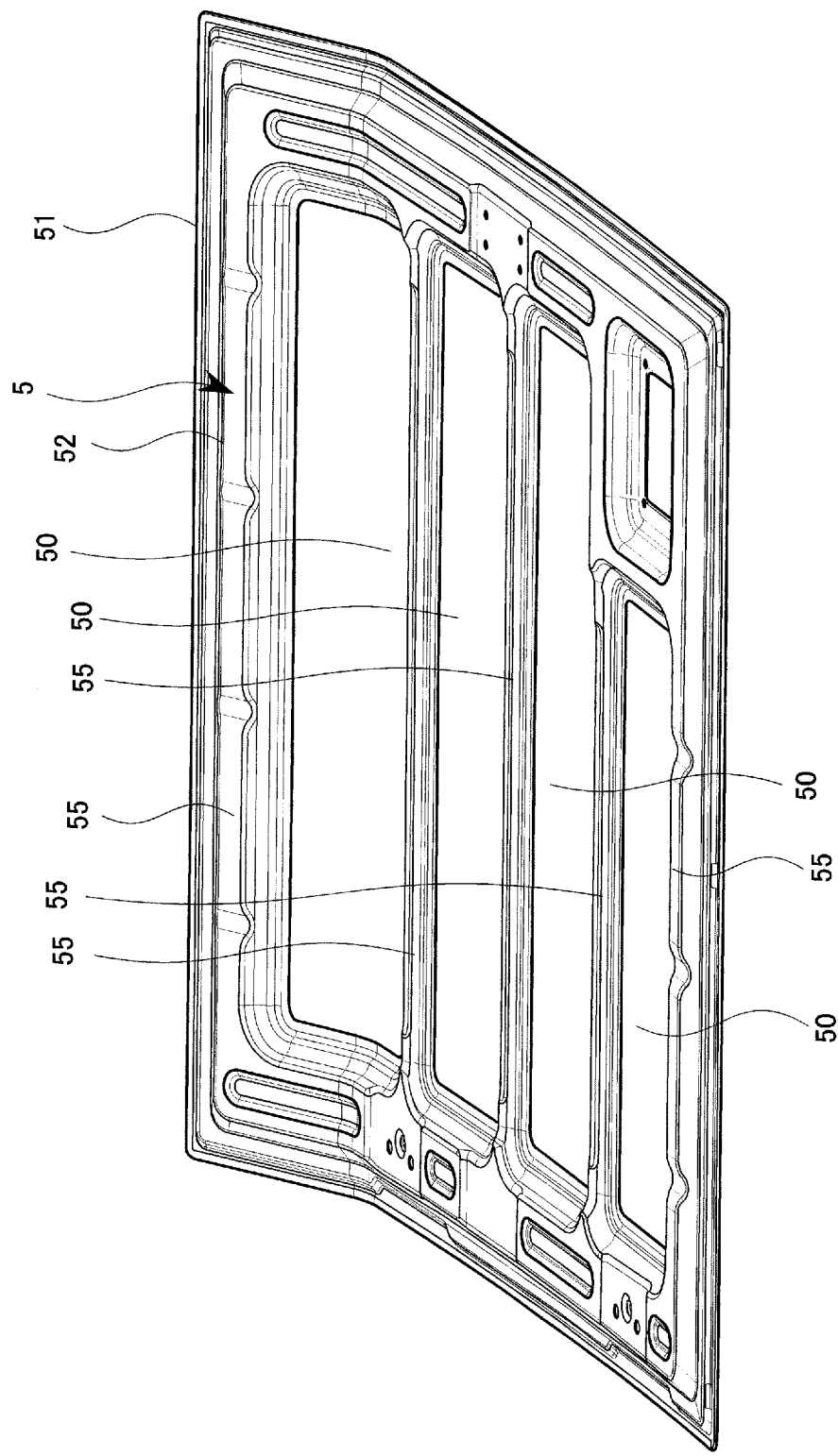
FIG. 1 is a perspective view of a door panel manufactured by a method according to the present invention.
Figure 2:
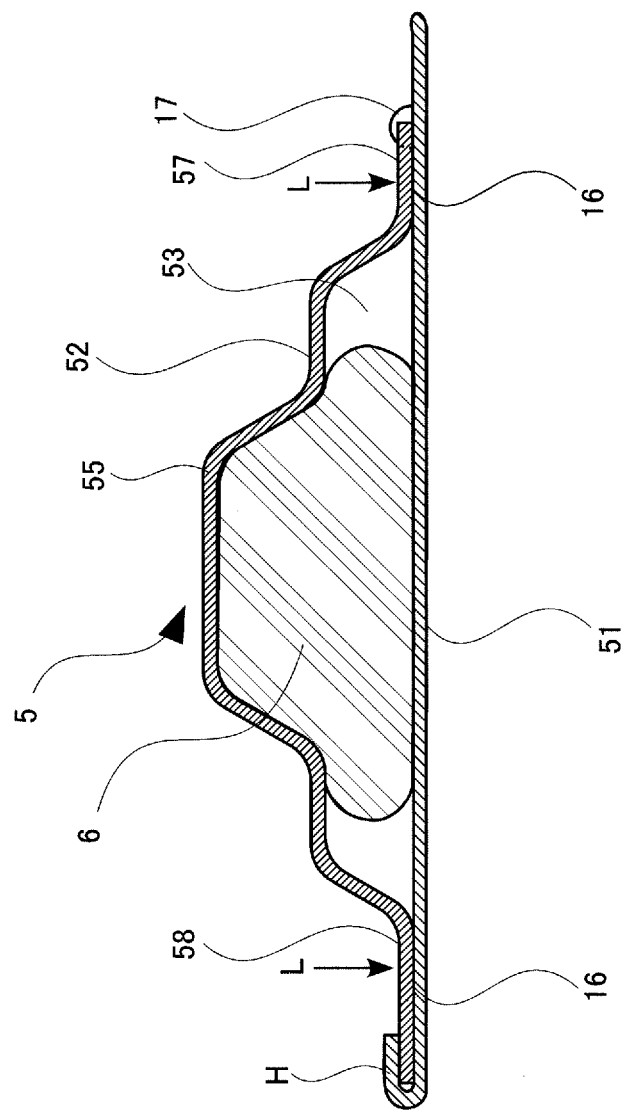
FIG. 2 is a schematic sectional view of a primary portion of the door panel manufactured by the method according to the present invention.
Figure 3:
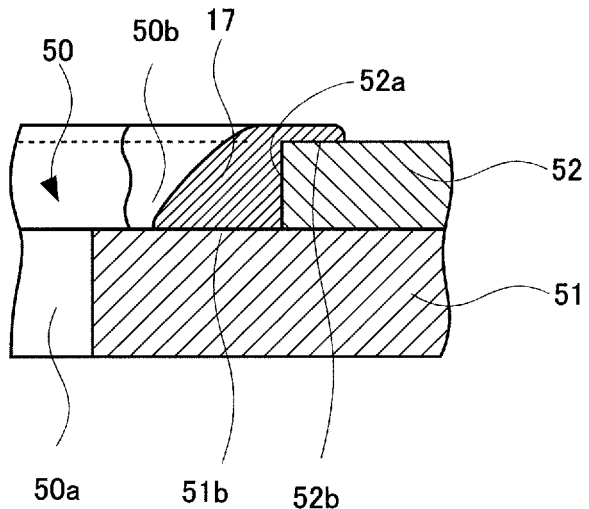
FIG. 3 is a schematic sectional view of a primary portion of the door panel manufactured by the method according to the present invention.

FIG. 1 through FIG. 3 show a door panel 5 for a side door. The door panel 5 includes an outer plate 51; an inner plate 52 which is pressed into a corrugated shape, with its bottom portions fixed to an inner surface of the outer plate 51 while its ridge portions providing a space 53 between the inner plate and the outer plate 51; and a foam material 6 which is placed and set to fill the space 53 between the outer plate 51 and the inner plate 52. In the present embodiment, the outer plate 51 and the inner plate 52 are provided with four rows of vent openings 50.

The inner plate 52 includes an open-side bond part 57 and an outer-side bond part 58 which are portions bonded to the outer plate 51; and a ridge portion 55 which is formed to bulge out of the bond parts 57, 58, away from the outer plate 51.

As shown in FIG. 2, an outer circumferential edge of the outer plate 51 includes a hemmed portion H, i.e., a portion which is bent over to wrap a circumferential edge of the inner plate 52 and then pressed flat thereby seaming the circumferential edge of the inner plate 52. The bond parts 57, 58 in the inner plate 52 are bonded to the outer plate 51 first with a bonding adhesive 16. The bonding adhesive 16 provides bonding and sealing between the outer plate 51 and the bond parts 57, 58 of the inner plate 52.

As shown in FIG. 2 and FIG. 3, the inner plate 52 has a larger vent opening 50b surrounding a vent opening 50a in the outer plate 51. Between an edge of the vent opening 50b of the inner plate 52 and an upper surface of the outer plate 51 beneath the vent opening 50b, a sealing agent 17 is applied along the edge of the vent opening 50b. As will be described later, the sealing agent 17 is provided by the same adhesive as an adhesive 16. The adhesive may be a paste type structural adhesive which has a sufficiently high viscosity to maintain its shape as it is applied, and appropriate thermosetting characteristics. An example of the paste type structural adhesive is thermosetting epoxy adhesive. The adhesive 16 may not necessarily be a thermosetting adhesive. Other adhesives which are usable include ultraviolet-setting adhesive, visible-light-setting adhesive, etc.

As shown in FIG. 3, since the bonded inner plate 52 has a greater vent opening 50b surrounding a vent opening 50a in the outer plate 51, the sealing agent 17 is applied along the edge of the vent opening 50b of the inner plate 52, to form a wide adhesion covering region from an adhesion covering region 51b on the outer plate 51 which is adjacent to an opening cutout surface 52a in the inner plate 52 to an opening-edge adhesion covering region 52b on the inner plate 52 which is adjacent to an edge of the opening in the inner plate 52.

Since the application is made to overlap the inner plate 52, or since the sealing agent 17 provides bonding over an increased area, the bond parts now have improved durability. Also, since the sealing agent 17 is provided by adhesive, bonding strength is also improved.

As shown in FIG. 1 and FIG. 2, the ridge portion 55 has superb sectional performances in terms of second moment of area for example, so as not to be deformed easily by such a force as bending stress.

Also, as shown in FIG. 2, laser tack weld is performed at an appropriate interval such as 10 mm through 1000 mm to the bond parts 57, 58 between the inner plate 52 and the outer plate 51. When performing this laser welding, laser application is made from the inner plate 52 side so that no weld marks will be visible on the side where the outer plate 51 is exposed. Laser output and laser application time is controlled so that only a part of the outer plate 51 which is in contact with the inner plate 52 will become molten to provide weldment.

The outer plate 51 is 1.2 through 5 times thicker than the inner plate 52. In other words, the inner plate 52 is made of a steel plate which is thinner than that of the outer plate 51. For example, if the outer plate 51 is made of a steel plate having a 1.2 mm thickness, it is desirable to make the inner plate 52 with a steel plate having a 0.6 mm or 0.8 mm, for example, so that two conflicting requirements, i.e., strength and workability will be satisfied.

The foam material 6 is, for example, first bonded as a sheet which has not undergone a foaming step, to an inner surface of the inner plate 52, and then heated to foam in a space between the outer plate 51 and the inner plate 52. The foaming material is preferably provided by a sound absorbing rubber material which has high foamability and a volumetric expansion coefficient of 20 approximately. Heating of the foaming material may be made simultaneously with baked coating, using a baking finish furnace.

Figure 4:
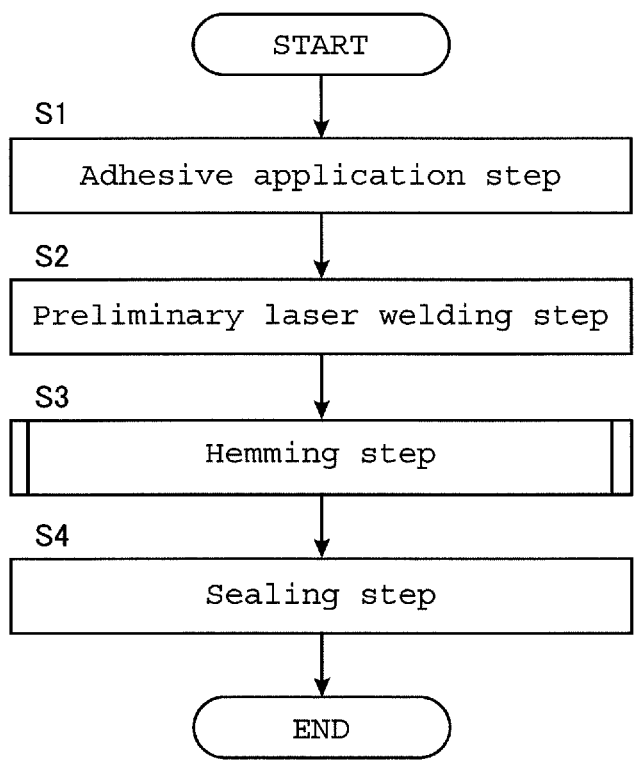
FIG. 4 is a flow chart showing steps in the manufacturing method according to the present invention.

Next, a manufacturing method for the door panel 5 will be described with reference to a flowchart in FIG. 4.

Figure 6:
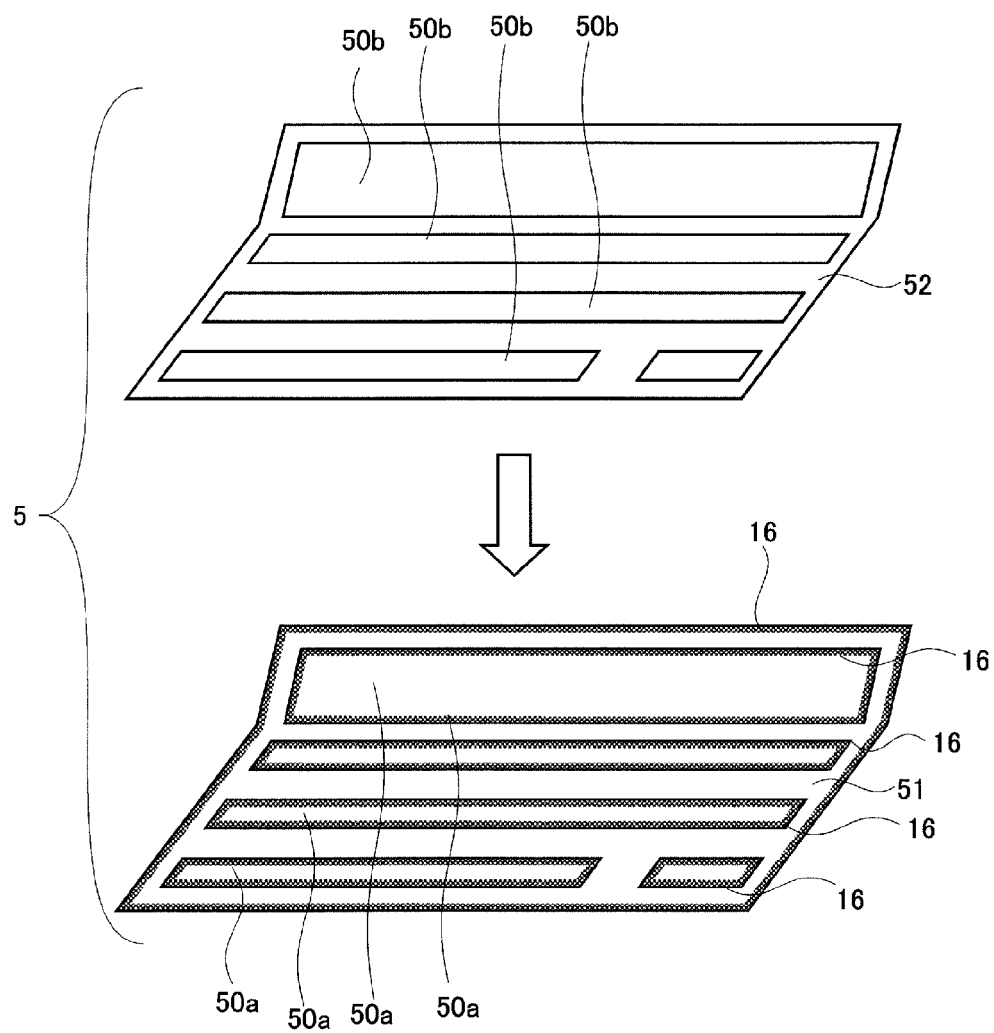
FIG. 6 is a schematic exploded perspective view showing regions of adhesive application in the manufacturing method according to the present invention.

First, an adhesive 16 is applied to predetermined places on the outer plate 51 using adhesive application equipment (Step S1). As shown in FIG. 6, the adhesive 16 is applied along the outer circumference and along the openings 50a of the outer plate 51. The adhesive 16 and the sealing agent 17 which will be described later are provided by the same adhesive. Therefore, the same adhesive from the same adhesive tank is supplied to adhesive application equipment for the adhesive 16 for bonding of the outer plate 51 and the inner plate 52, as well as to adhesive application equipment for application of the sealing agent 17 at predetermined consistent conditions such as adhesive viscosity. The adhesive application equipment will be described later.

After the application of the adhesive 16 to the outer plate 51, the outer plate 51 and the inner plate 52 are aligned with each other as shown in FIG. 6, and then preliminary bonded to each other. In the present embodiment, the preliminary bonding is performed by means of laser welding (Step S2).

Figure 9:
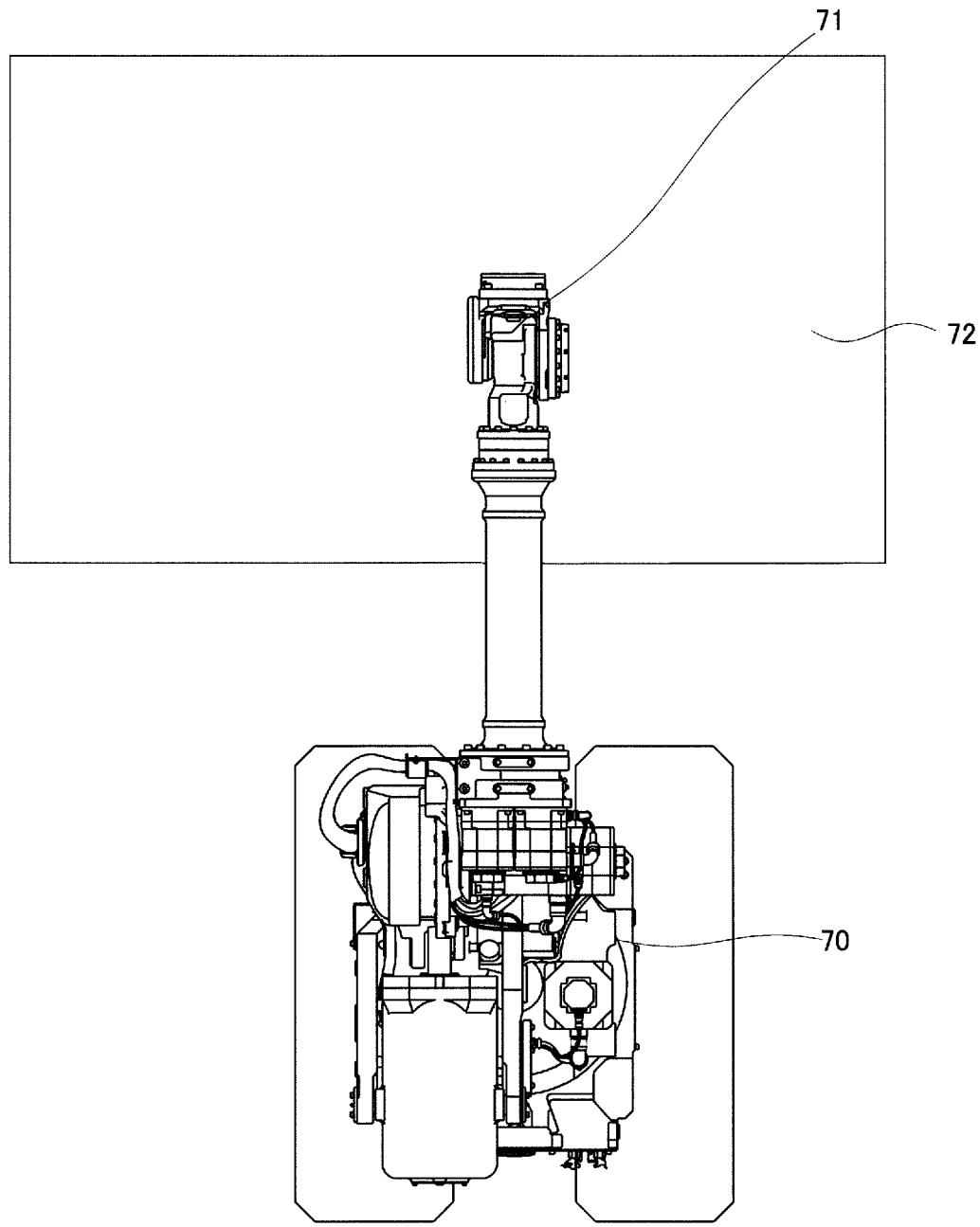
FIG. 9 is a schematic diagram showing laser welding apparatus used in the present invention.

FIG. 9 is a schematic diagram of an apparatus used for the laser welding. It includes a robot 70 which has a tip portion provided with laser equipment 71. The door panel 5 as a bonded assembly of the outer plate 51 and the inner plate 52 is set on a stage 72. The laser equipment 71 uses a YAG laser for example. Then, laser welding is performed to the bond parts 57, 58 between the inner plate 52 and the outer plate 51 at an appropriate interval of 10 mm through 1000 mm. Sweeping operation of the laser equipment 71 is performed by the robot 70 as it moves the laser equipment 71 to predetermined positions on the inner plate 52. As the laser equipment 71 sweeps, the laser beam is applied to the inner plate 52. This laser welding is only to the extent to provide preliminary bonding. Laser output and laser application time is controlled so that only a part of the outer plate 51 which is in contact with the inner plate 52 will be welded but no weld marks will be visible on the side where the outer plate 51 is exposed.

Preferably, the welding should be accompanied by air-blowing since the welding produces a large amount of sparks which can damage a lens at the tip of the laser equipment 71. Also, the laser welding must be performed in such a spot making sequence as not deforming the welded product.

It should be noted here that the above embodiment uses an arrangement where the robot 70 moves the laser equipment 71 for the welding operation. Alternatively, the stage 72 may be configured for movement in XYZ directions, so that the door panel 5 can be moved for the laser welding.

By using laser welding for the preliminary bonding operation, the product will be free of dents which are unavoidable in spot welding, and the laser welding process improves quality of external appearance.

Subsequently, hemming is performed (Step S3), in which the outer circumferential edge of the outer plate 51 is bent over, to wrap the circumferential edge of the inner plate 52, and then pressed flatly. In this hemming operation, the outer circumferential edge of the outer plate 51 is tucked over the circumferential edge of the inner plate 52, whereby the two are seamed with each other. The hemming operation according to the present invention includes three or more steps to achieve the overall bending procedure. In the present embodiment three kinds of mold are prepared, and the operation is performed in three steps, so that different types of door panels can be processed.

Figure 5:
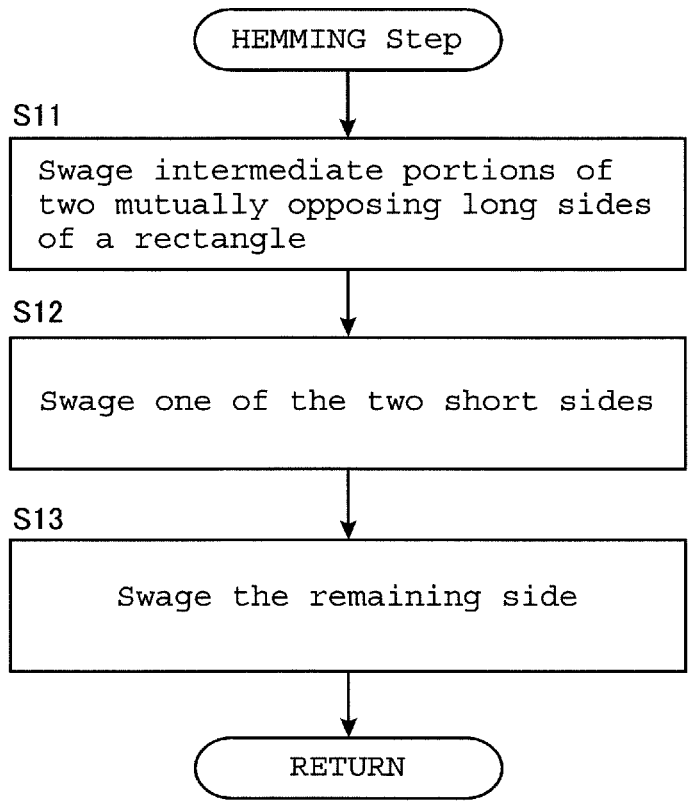
FIG. 5 is a flow chart showing a hemming step in the manufacturing method according to the present invention.
Figure 10:
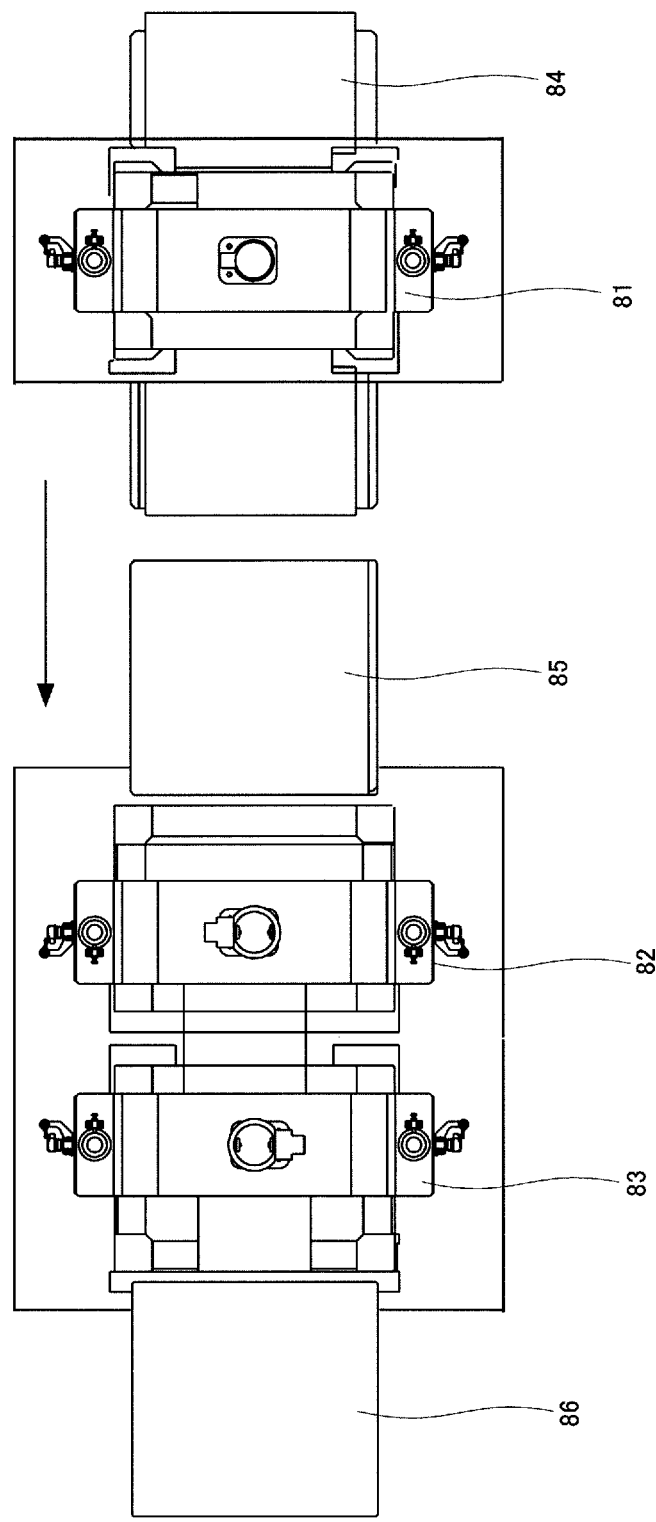
FIG. 10 is a schematic diagram showing hemming equipment used in the present invention.

As shown in FIG. 10, three pieces of hemming equipment 81, 82, 83 are employed in the present embodiment, so that pressing procedures in the hemming operation can be performed to different places of the panel. Now, reference will be made to FIG. 10 and a flowchart in FIG. 5 to describe the hemming operation according to the present invention.

The hemming equipment 81 is the first to work in this hemming operation, by working on intermediate portions in two mutually opposed sides of a rectangular door panel 5. The door panel 5 in process is placed in a stage 84, and is transported by a transportation conveyor (not illustrated) to a predetermined position in the hemming equipment 81. Then, the intermediate portion on each of the long sides in the rectangular door panel 5 is bent and swaged first (Step S11).

After the swaging is performed to the intermediate portions, the door panel 5 is sent to the hemming equipment 82 for the next step of the hemming operation. Specifically, after the hemming is performed to the intermediate portions, the door panel 5 is sent to a next stage 85, and then transported to a predetermined position in the hemming equipment 82 by a transportation conveyor (not illustrated). This pressing equipment 82 bends and swages a portion from one of the two short sides to the swaged intermediate portions of the rectangular door panel 5 (Step S12). In the present embodiment, the swaging is made from the left short side through the swaged intermediate portions.

After the swaging is performed to the intermediate portions and the left side, the door panel 5 is sent to the hemming equipment 83 for the next step of the hemming operation. Specifically, after the hemming is performed to the intermediate portions and the left side portion, the door panel 5 is transported to a predetermined position in the hemming equipment 83 by a transportation conveyor (not illustrated). This pressing equipment 83 bends and swages a portion from remaining one of the two short sides to the swaged intermediate portions of the rectangular door panel 5 (Step S13). In the present embodiment, the swaging is made from the right short side through the swaged intermediate portions.

Once these three hemming procedures are finished, all of the sides have been swaged, and the door panel 5 which has completed the hemming process is sent to a stage 86.

Figure 11:
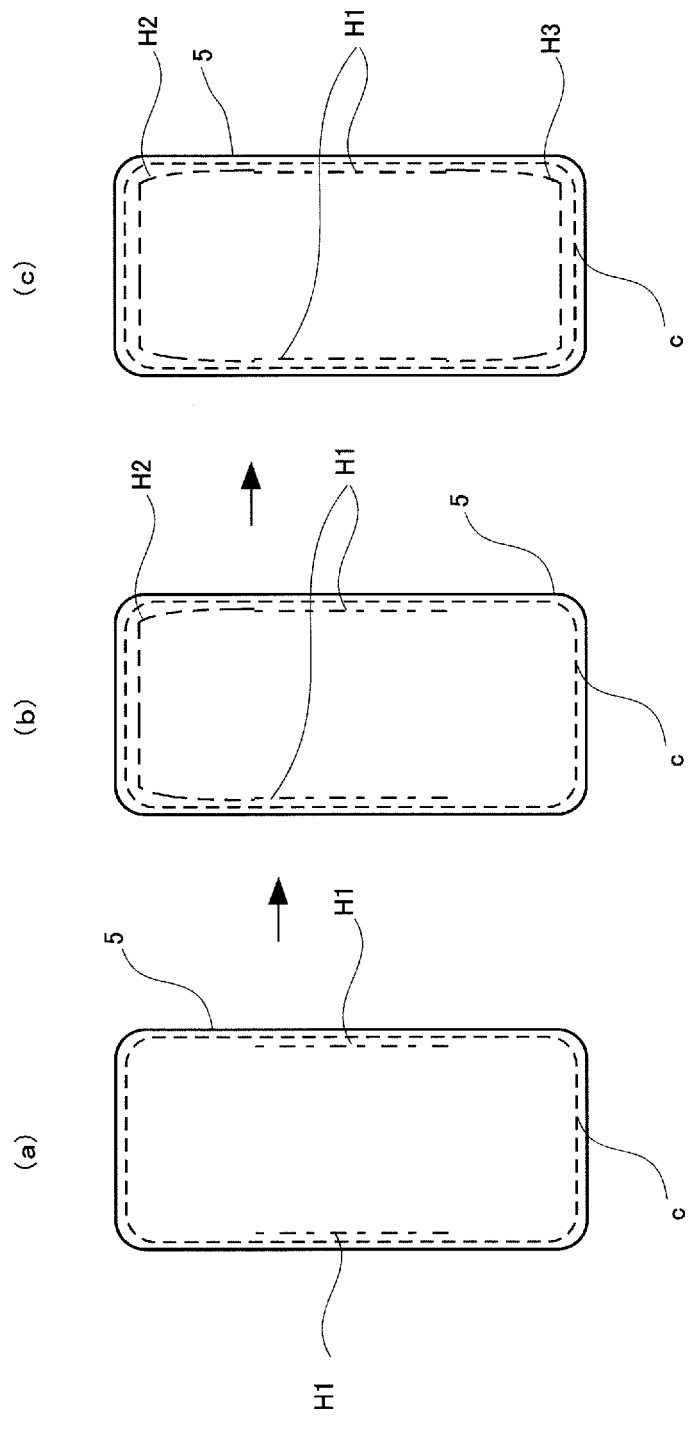
FIG. 11 is a schematic diagram showing a hemming step according to the present invention.
Figure 12:
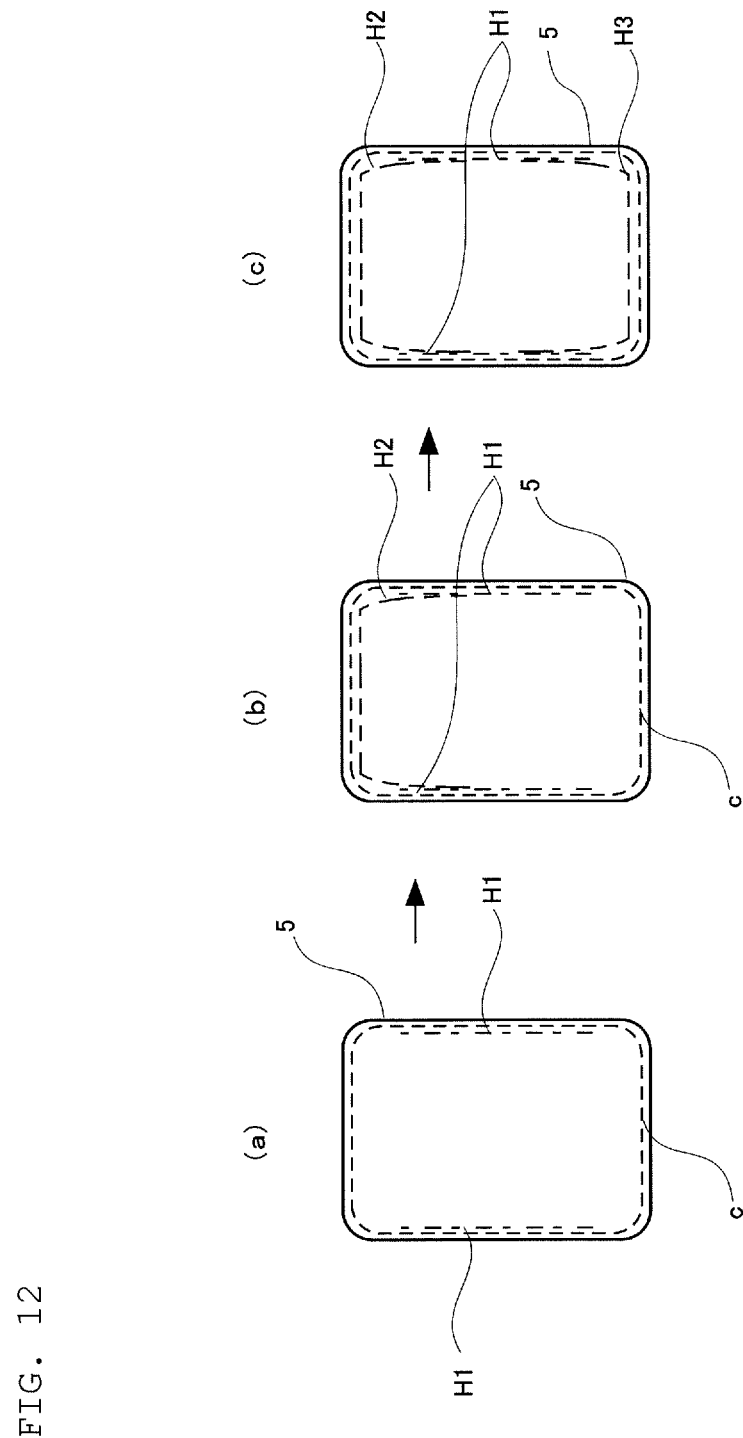
FIG. 12 is a schematic diagram showing a hemming step used in the present invention.

Now, reference will be made to FIG. 11 through FIG. 13 to further describe how a plurality of kinds of door panels may be handled by the same hemming equipment according to the present invention. FIG. 11 shows an example of working on a door panel 5 which has the longest handleable pattern whereas FIG. 12 shows an example of working on a door panel which has the shortest handleable pattern. FIG. 11 and FIG. 12 show bent-and-flattened regions c in broken lines while the figures also show swaged regions in alternate long and short dash lines H1 as well as in alternate long and two short dashes lines H2, H3.

FIG. 11 and FIG. 12 show two door panels 5, 5 as examples, which have an equal length in their short sides but different lengths in their long sides. As shown in FIG. 11(*a*) and FIG. 12(*a*), first, swaging is performed to intermediate portions in two mutually opposed long sides as indicated by the alternate long and short dash lines H1.

Subsequently, swaging is performed to a region indicated by the alternate long and two short dashes lines H2, which is an edge region ranging from the left short-side and to the swaged regions H1 in the middle of the long sides of the door panel 5*a*. In this process, the swaging indicated by the alternate long and short dash lines H1 and the swaging indicated by the alternate long and two short dashes lines H2 become continuous to each other in the longer door panel 5 which is shown in FIG. 11.

In the shorter door panel 5, the swaging indicated by the alternate long and short dash lines H1 and the swaging indicated by the alternate long and two short dashes lines H2 are overlapped with each other as shown in FIG. 12.

Finally, swaging is performed to a region indicated by an alternate long and two short dashes lines H3, which is an edge region ranging from the right short-side and to the swaged regions H1 in the middle of the long sides of the door panel 5. In this process, the swaging indicated by the alternate long and short dash lines H1 and the swaging indicated by the alternate long and two short dashes lines H3 become continuous to each other in the longer door panel 5 in FIG. 11.

In the shorter door panel 5, the swaging indicated by the alternate long and short dash lines H1 and the swaging indicated by the alternate long and two short dashes lines H3 are overlapped with each other as shown in FIG. 12.

Figure 13:
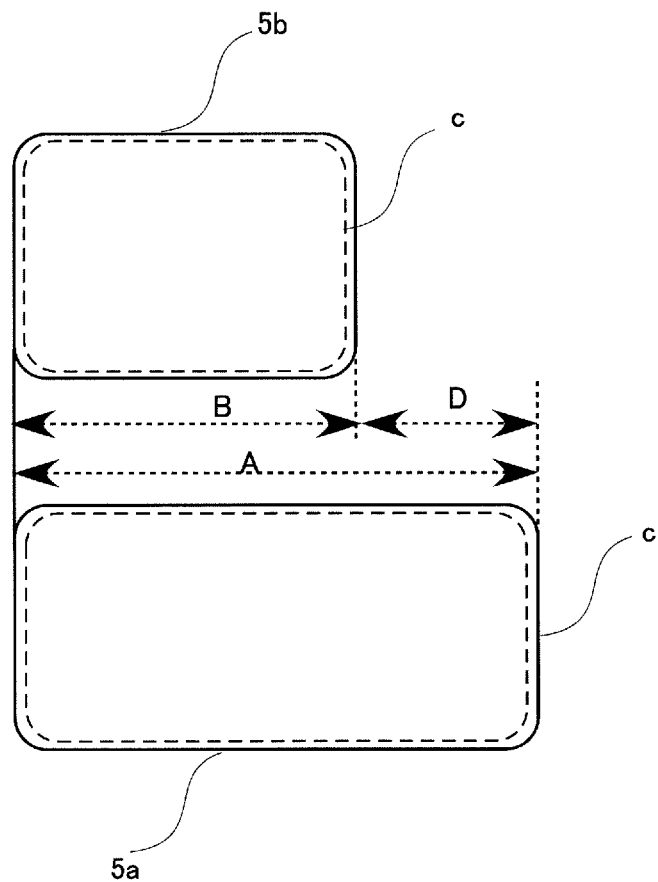
FIG. 13 is a schematic diagram showing a hemming operation performed to panels of different sizes, according to the present invention.

As described above, the arrangement makes it possible to hem the door panels 5*a*, 5*b* which are different from each other in their length as shown in FIG. 13, in the same molds. A maximum length A is the length which is achievable by the three hemming operations to make one continuous swaging lines. Also, a minimum length B is the length which is achievable by the left-side and the right-side hemming operations without making overlaps with each other. A length D, which is obtained by subtracting the length B from the length A, is a variable range in length. Door panels 5 falling in this size range are handleable by the present invention.

In the embodiment described above, the process is performed in steps, i.e., starting from an intermediate portion, then the right side, and finally the left side of the door. Although it is possible to change to a different sequence by swapping the operation to the right side with the operation to the left side, doing the left side first rather than the right side is more advantageous since this allows a better fit to the pressing equipment.

Also, dividing the process into steps allows simplification of the mold structure (to a boneless structure), so it is now possible to extend the transportation conveyor into the mold, which leads to more stable transportation of the door panels.

Once the hemming process along the circumferential edge of the outer plate 51 is finished, the door panel 5 is brought to adhesive application equipment for application of an adhesive in a sealing operation (Step S4).

Figure 14:
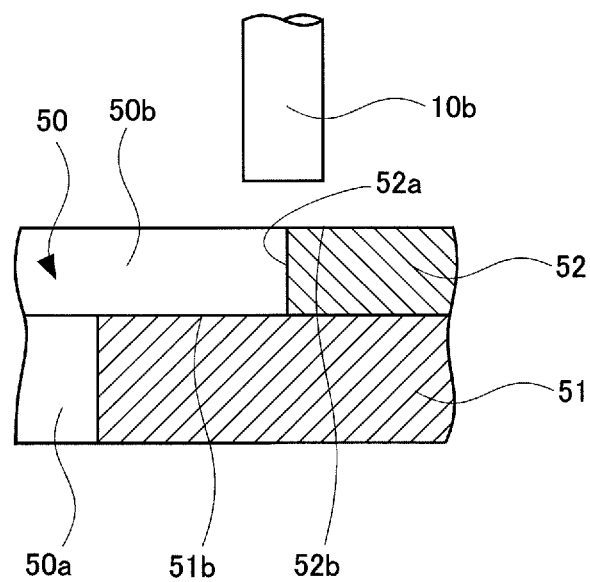
FIG. 14 is a schematic sectional view showing a state of sealing agent application according to the present invention.

As shown in FIG. 14, an adhesive from a sealing agent supply device 10*b* is applied as the sealing agent 17 over a wide adhesion covering region along opening cutout surface which defines a perimeter of the vent opening 50b in the inner plate 52, from an adhesion covering region 51b on the outer plate 51 which is adjacent to the opening cutout surface 52a of the inner plate 52, to an opening edge adhesion covering region 52b on the inner plate 52 which is adjacent to the opening cutout surface 52a of the inner plate 52.

The outer plate 51 and the inner plate 52 are then placed in a bake-coating oven to allow setting of the thermosetting bonding adhesive 16 applied therebetween and thereby bonding the outer plate 51 and the inner plate 52 with each other as well as allowing the foaming material to foam thermally.

Further, heating in the bake-coating oven gives baked finish to the outer surfaces of the outer plate 51 and the inner plate 52 by curing the paint which was sprayed on the surfaces in advance.

For example, the adhesive 16 and the sealing agent 17 may be set at heating at a temperature of 160 degrees Celsius for ten minutes whereas baking to the coating may be achieved by heating at a temperature of 180 degrees Celsius through 200 degrees Celsius for twenty minutes. These heating operations can be achieved by using a existing bake-coating oven.

Door panels can thus be manufactured by following the method described above.

The adhesive 16 and the sealing agent 17 are provided by the same adhesive. Therefore, the same adhesive from the same adhesive tank 11 is supplied to supply devices 10 (10a, 10b), for application of the adhesive 16 for bonding the outer plate 51 and the inner plate 52 with each other, as well as for application of the sealing agent 17, under predetermined consistent conditions such as a consistent adhesive viscosity.

Figure 7:
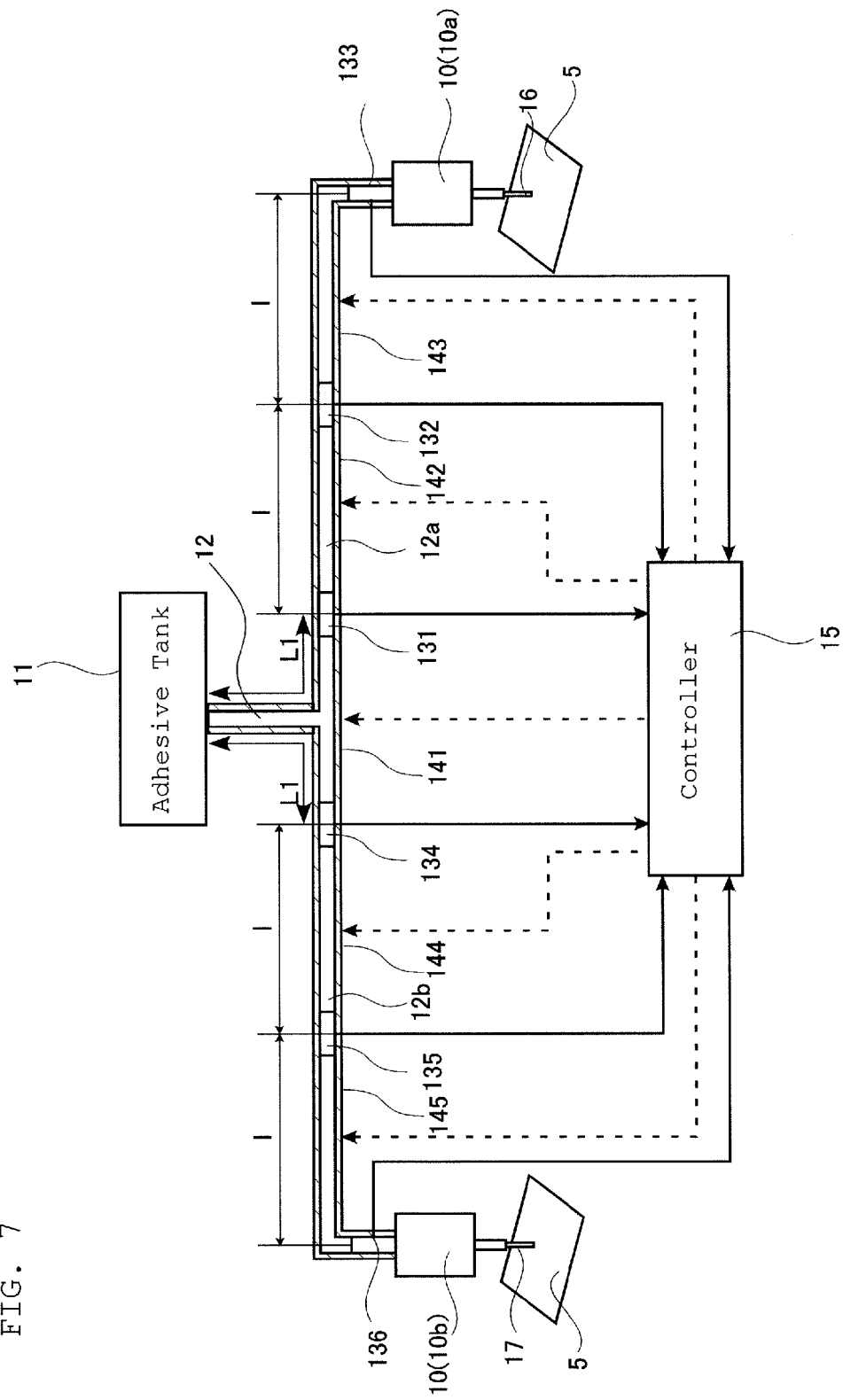
FIG. 7 is a block diagram showing adhesive application equipment used in the present invention.
Figure 8:
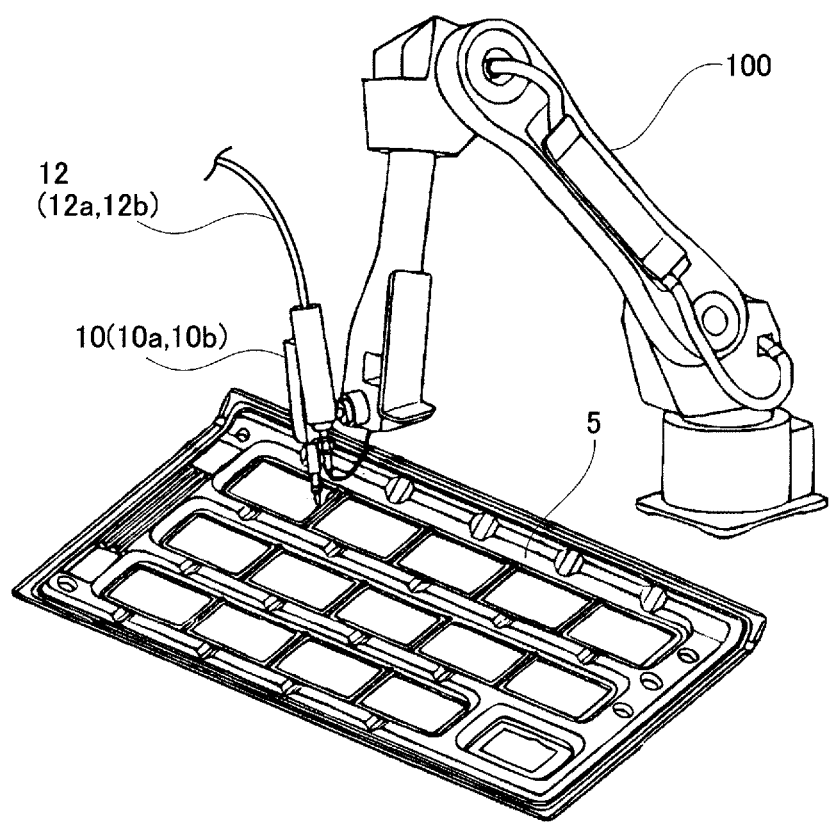
FIG. 8 is a schematic diagram showing an adhesive applicator apparatus for application of an adhesive used in the present invention.

This adhesive application equipment will be described with reference to FIG. 7 and FIG. 8. FIG. 7 is a block diagram showing a configuration of the adhesive application equipment used in the present invention whereas FIG. 8 is a schematic diagram showing an adhesive applicator apparatus for application of the adhesive. The adhesive applicator apparatus is a robot 100 including a tip portion having an adhesive cartridge holder, and the adhesive supply device 10 (10a, 10b) for dispensing a predetermined amount of adhesive which is squeezed from the adhesive cartridge inside the holder. The adhesive supply device 10 (10a, 10b) has a lower end provided with an adhesive application nozzle. The robot 100 is capable of moving the adhesive application nozzle of the adhesive supply device 10 (10a, 10b) to anywhere according to operation programs based on e.g. three-dimensional coordinate values and speed commands, as well as controlling the amount of the adhesive supplied from the adhesive supply device 10 (10a, 10b) by controlling adhesive squeezing pressure.

As shown in FIG. 7, the adhesive application equipment used in the present invention includes an adhesive tank 11 to store the adhesive. From this adhesive tank 11, the adhesive is supplied via pipes 12, to the adhesive supply device 10a which applies the adhesive 16 for bonding of the door panel 5, and to the adhesive supply device 10b which applies the adhesive 16 as the sealing agent.

The adhesive is subject to changes in viscosity for example, at different temperatures, and becomes impossible to maintain a predetermined adhesive fluidity. This result in a problem that the amount of adhesive applied is inconsistent. To avoid this, the present invention provides an arrangement that temperatures in the pipes 12 are measured by a plurality of temperature sensors 131 through 136, and based on outputs from these sensors, a controller 15 controls outputs from heaters 141 through 145 which control the temperature in the pipes 12. In this way, the temperature of the adhesive inside the pipes 12 is maintained at a desirable level within a range from 20 through 40 degrees, thereby maintaining the adhesive fluidity stably, eliminating variations in the amount of adhesive applied, and providing stability in the bonding and sealing.

In the present embodiment, piping has two routes, i.e., one provided by pipes 12a from the adhesive tank 11 to the adhesive supply device 10a used for bonding the door panel 5, and the other provided by pipes 12b to the adhesive supply device 10b used for applying the sealing agent to the door panel 5. These pipes 12a, 12b have the same length, each being provided with temperature sensors at three locations. Specifically, the pipes 12a are provided with sensors 131, 132, 133 whereas the pipes 12b are provided with sensors 134, 135, 136.

The adhesive tank 11 is away from the first sensors 131, 134 by the same distance L1. Likewise, the first sensors are away from their corresponding second sensors, and the second sensors are away from their corresponding third sensor is by the same distance I.

With the above arrangement, heaters 141, 142, 143, 144, 145 are provided around the pipes 12, 12a, 12b, and the controller 15 controls outputs of these heaters based on the corresponding sensors so that the temperature of the adhesive inside the pipes is maintained at a substantially consistent level, i.e., within a range from a predetermined temperature to the temperature.

Since the amount of adhesive applied is controlled accurately as described, the invention makes it possible to reliably perform quality control operations on, e.g. adhesive application to the inner plate regions and adhesive application patterns for corking purposes, making the invention applicable to highly demanding design requirements as found in important structural body parts.

The invention also provides an advantage that use of adhesive as the sealing agent 17 improves sealing performance and bonding strength.

In the embodiment described above, the adhesive supply device 10 (10a, 10b) is moved by the robot 100 for adhesive application. Alternatively, however, the stage which supports the door panel 5 may be configured for movement in XYZ directions, so that the door panel 5 can be moved for the adhesive application.

In the embodiment, the adhesive 16 and the sealing agent 17 are provided by a thermosetting adhesive. However, the adhesive 16 and the sealing agent 17 may be provided by an ultraviolet-setting adhesive or visible-light-setting adhesive for example.

In the case where the adhesive 16 and the sealing agent are provided by an ultraviolet-setting adhesive, ultraviolet (UV) lights are employed in the adhesive setting step to apply ultraviolet rays. Also, the adhesive is directly irradiated with ultraviolet rays from the ultraviolet lights to cure the adhesive. Ultraviolet-setting adhesive can shorten the curing step since it cures quickly as it receives ultraviolet rays. However, the arrangement may require deodorization equipment since ultraviolet rays applied to atmospheric air will produce ozone.

Use of a visible-light-setting adhesive as the adhesive 16 and the sealing agent 17 provides an advantage that curing can be achieved by sun light, fluorescent light, or natural energy or by a smaller amount of energy. If a visible-light-setting adhesive is utilized, the adhesive curing step may be achieved by employing fluorescent lighting equipment for example, so that the adhesive is irradiated with visible light from the fluorescent light tubes. With an irradiation process at an approximately 70,000 luxes from 27 Watt fluorescent light tubes for about two minutes, it is possible to cure the adhesive 16 and the sealing agent 17. Use of fluorescent lights tubes in the adhesive curing step does not produce any ozone so there is no need to provide deodorization equipment. Also, the arrangement can shorten the time required for the curing step as compared to arrangements with a thermosetting adhesive since it requires a shorter curing time of approximately two minutes.

In the embodiment described above, description was made for a case where the present invention was applied to door panels of industrial equipment. However, the present invention is applicable to whatever door panels as far as they are double-wall panels composed of an outer plate and an inner plate.

All of the embodiments disclosed herein are to show examples, and should not be considered as of a limiting nature in any way. The scope of the present invention is identified by the claims and is not by the descriptions of the embodiments given hereabove, and it is intended that the scope includes all changes falling within equivalents in the meaning and extent of the Claims.

REFERENCE SIGNS LIST 5 door panel
51 outer plate
52 inner plate
10, 10a, 10b adhesive supply device
12, 12a, 12b the pipes
11 adhesive tank
16 adhesive
17 sealing agent (adhesive)

The invention claimed is:

1. A panel manufacturing method for a panel made of an outer plate integrated with an inner plate, comprising:
   a step of applying an adhesive to a predetermined place on the outer plate;
   a step of mating the outer plate and the inner plate with each other and providing preliminary bonding by laser welding;
   a step of hemming by bending an outer edge portion of the pre-bonded outer plate to wrap over circumferential edge portions of the inner plate and then pressing flat; and
   a step of sealing the panel by applying an adhesive to the panel after completion of the hemming step performed to the outer plate's circumferential edge portion.

2. The panel manufacturing method according to claim 1, wherein the hemming step is performed in three or more sub-steps each involving the bending operation.

3. The panel manufacturing method according to claim 2, wherein the hemming step includes a sub step of bending and swaging mutually opposing intermediate portions in two longer sides of a rectangular panel; a sub step of bending and swaging a portion from one of two short sides of the panel to the previously swaged intermediate portions; and a sub step of bending and swaging a portion from a remaining short side to the already swaged intermediate portions of the panel.

4. The panel manufacturing method according to claim 1, wherein the outer plate and the inner plate have a plurality of vent openings and an adhesive for sealing is applied along an edge of the vent openings.

5. The panel manufacturing method according to claim 4, wherein the vent opening in the inner plate is greater than and surrounding a corresponding one in the outer plate.

6. The panel manufacturing method according to claim 4, wherein the adhesive is provided by a thermosetting adhesive, the outer plate and the inner plate being placed in a heating apparatus as integrated with each other when setting the adhesive.

7. The panel manufacturing method according to claim 1, wherein a laser beam is applied to the inner plate to weld part of the outer plate which is in contact with the inner plate for the preliminary bonding.

8. The panel manufacturing method according to claim 4, wherein the adhesive is provided by a visible-light-setting adhesive, the adhesive being irradiated with a light from a fluorescent light bulb under a state where the outer plate and the inner plate are integrated with each other when setting the adhesive.

9. The panel manufacturing method according to claim 1, wherein the adhesive in the adhesive application step and the adhesive in the sealing step are supplied from a same adhesive tank.

10. The panel manufacturing method according to claim 9, wherein the adhesive is supplied from the adhesive tank to an adhesive supply device via pipes provided with a plurality of temperature sensors and a plurality of heaters controlled in relation to the temperature sensors, each of the heaters being controlled independently from the others based on an output from a corresponding one of the temperature sensors.

11. The panel manufacturing method according to claim 1, wherein the outer plate is 1.2 times to 5.0 times thicker than the inner plate.

* * * * *